United States Patent
Cooper

(10) Patent No.: US 9,401,929 B2
(45) Date of Patent: *Jul. 26, 2016

(54) METHOD, SYSTEM AND COMPUTER PROGRAM PRODUCT FOR TAGGING CONTENT ON UNCONTROLLED WEB APPLICATION

(71) Applicant: Socialware, Inc., Austin, TX (US)

(72) Inventor: Cameron Blair Cooper, Lakeway, TX (US)

(73) Assignee: Proofpoint, Inc., Sunnyvale, CA (US)

( * ) Notice: Subject to any disclaimer, the term of this patent is extended or adjusted under 35 U.S.C. 154(b) by 238 days.

This patent is subject to a terminal disclaimer.

(21) Appl. No.: 13/755,537

(22) Filed: Jan. 31, 2013

(65) Prior Publication Data

US 2013/0145423 A1    Jun. 6, 2013

Related U.S. Application Data

(63) Continuation of application No. 12/785,304, filed on May 21, 2010, now Pat. No. 8,387,110.

(60) Provisional application No. 61/303,191, filed on Feb. 10, 2010.

(51) Int. Cl.
*G06F 17/00* (2006.01)
*H04L 29/06* (2006.01)
(Continued)

(52) U.S. Cl.
CPC .............. *H04L 63/20* (2013.01); *H04L 63/102* (2013.01); *H04L 67/02* (2013.01); *G06F 9/4443* (2013.01);
(Continued)

(58) Field of Classification Search
CPC ......... G06F 17/27; G06F 17/30; G06F 17/20; G06F 17/218; G06F 17/30861; G06F 17/3089; G06F 17/30902; G06F 17/30905; G06F 17/30908; G06F 9/4443; H04L 63/02; H04L 67/10; H04L 67/02; H04L 63/104; H04L 63/105; H04L 67/30; H04L 67/306
USPC ........ 726/1–15, 1–17; 709/226, 229; 715/234
See application file for complete search history.

(56) References Cited

U.S. PATENT DOCUMENTS 6,558,431 B1 * 5/2003 Lynch ................. G06F 17/3089
707/E17.116
6,772,214 B1 * 8/2004 McClain ........... G06F 17/30902
707/999.01
(Continued)

OTHER PUBLICATIONS

Office Action issued for U.S. Appl. No. 12/785,304, mailed Jun. 19, 2012, 12 pages.
(Continued)

*Primary Examiner* — Jayesh Jhaveri
(74) *Attorney, Agent, or Firm* — Sprinkle IP Law Group

(57) ABSTRACT

Communications by a device in a private network to a site operating outside of the network can be programmatically inspected. Unstructured data, including messages and application content, originating from outside of the network may be dynamically converted to structured data that can be tagged. Interactions and activities can be monitored and processed differently according to internal policies and/or business rules. For example, at least a portion of the structured data can be modified prior to forwarding to the device, access by the device to at least a portion of the structured data can be blocked or limited, access by the device to one or more features associated with the structured data can be blocked or limited, etc.

30 Claims, 10 Drawing Sheets

(51) Int. Cl.
*H04L 29/08* (2006.01)
*G06F 21/00* (2013.01)
*G06F 17/30* (2006.01)
*G06F 9/44* (2006.01)

(52) U.S. Cl.
CPC ....... *G06F 17/3089* (2013.01); *G06F 17/30861* (2013.01); *G06F 17/30902* (2013.01); *G06F 17/30905* (2013.01); *G06F 17/30908* (2013.01); *G06F 21/00* (2013.01); *H04L 63/104* (2013.01); *H04L 63/105* (2013.01); *H04L 67/30* (2013.01); *H04L 67/306* (2013.01)

(56) References Cited

U.S. PATENT DOCUMENTS

| | | | |
|---|---|---|---|
| 7,024,691 B1* | 4/2006 | Herzberg et al. | 726/5 |
| 7,325,014 B1* | 1/2008 | Kennedy | G06F 17/3089 |
| 8,108,902 B2* | 1/2012 | Ross | G06F 21/53 707/694 |
| 8,365,241 B1* | 1/2013 | Gunda | 726/1 |
| 8,387,110 B1 | 2/2013 | Cooper | |
| 8,428,997 B2* | 4/2013 | Maga | G06Q 10/06375 700/36 |
| 2003/0009495 A1* | 1/2003 | Adjaoute | G06F 17/27 715/255 |
| 2004/0010710 A1* | 1/2004 | Hsu et al. | 713/201 |
| 2004/0143757 A1* | 7/2004 | Cheng | 713/201 |
| 2005/0021796 A1* | 1/2005 | McClain et al. | 709/229 |
| 2005/0120242 A1* | 6/2005 | Mayer | G06F 21/56 726/4 |
| 2006/0143688 A1 | 6/2006 | Futoransky et al. | |
| 2007/0208751 A1 | 9/2007 | Cowan et al. | |
| 2007/0233902 A1 | 10/2007 | Trefler et al. | |
| 2008/0016552 A1* | 1/2008 | Hart | 726/3 |
| 2008/0189768 A1* | 8/2008 | Callahan | H04L 63/105 726/4 |
| 2008/0207137 A1* | 8/2008 | Maharajh | G06F 17/30035 455/74 |
| 2008/0222734 A1 | 9/2008 | Redlich et al. | |
| 2008/0228910 A1* | 9/2008 | Petri | G06F 17/30905 709/224 |
| 2008/0250484 A1* | 10/2008 | Chong et al. | 726/7 |
| 2009/0138794 A1* | 5/2009 | Becker | G06F 9/4443 715/234 |
| 2010/0318507 A1 | 12/2010 | Grant et al. | |
| 2011/0099482 A1* | 4/2011 | Koved | G06F 21/604 715/741 |
| 2013/0151698 A1 | 6/2013 | Cooper | |

OTHER PUBLICATIONS

Notice of Allowance issued for U.S. Appl. No. 12/785,304, mailed Nov. 8, 2012, 12 pages.
Office Action issued for U.S. Appl. No. 13/752,089, mailed Dec. 1, 2014, 33 pages.
Office Action issued for U.S. Appl. No. 13/752,089, mailed Apr. 23, 2015, 33 pages.
Office Action issued for U.S. Appl. No. 13/752,089, mailed Oct. 22, 2015, 38 pages.

* cited by examiner

900

| Roles | Users | Moderation | Rules | Filters | Platforms | Customers |

Add Role

Name
[                              ]

Type
[                              ]

Parent Role
[ Choose One                 ▼]

☐ Enable Social Bar   ☐ Enable Terms of Service

[f] [In] [t]

Facebook Rules

☐ Block All                      ☐ Block Chat
☐ Block Applications             ☐ Block Creating Albums
☐ Block Creating Events          ☐ Block Profile Editing
☐ Block Events                   ☐ Block Groups
☐ Block Inbox                    ☐ Block Notes
☐ Block Posting Video            ☐ Block Recording Video
☐ Block Uploading Photos         ☐ Block Status Updates
☐ Block Writing Comments         ☐ Archive Home Page
☐ Archive Profiles               ☐ Archive Read Messages
☐ Archive Status Updates         ☐ Archive Inline Comments
☐ Archive Inbox Send             ☐ Archive Inbox Reply
☐ Archive Group Posts            ☐ Archive Group Discussion Posts
☐ Archive Chat                   ☐ Block Photo Tagging
☐ Status Moderation              ☐ Block Delete Status Updates
☐ Block Hiding User Comments     ☐ Block Profile Blurbs
☐ Block Group Discussions        ☐ Block Create Ad
☐ Block Liking Comments          ☐ Block Unliking Comments
☐ Archive Create Ad Default
Test
Add New Role © 2010 Socialware Inc.     [cancel] [submit]

METHOD, SYSTEM AND COMPUTER PROGRAM PRODUCT FOR TAGGING CONTENT ON UNCONTROLLED WEB APPLICATION

CROSS-REFERENCE TO RELATED APPLICATIONS

This is a continuation of and claims priority from U.S. patent application Ser. No. 12/785,304, filed May 21, 2010, now U.S. Pat. No. 8,387,110, entitled "METHOD, SYSTEM AND COMPUTER PROGRAM PRODUCT FOR TAGGING CONTENT ON UNCONTROLLED WEB APPLICATION", which claims priority from U.S. Provisional Application No. 61/303,191, filed Feb. 10, 2010, entitled "METHOD, SYSTEM AND COMPUTER PROGRAM PRODUCT FOR ENFORCING ACCESS CONTROLS TO FEATURES AND SUBFEATURES ON UNCONTROLLED WEB APPLICATION," which is fully incorporated herein by reference. This application relates to U.S. patent application Ser. No. 13/752,089, filed Jan. 28, 2013, entitled "METHOD, SYSTEM AND COMPUTER PROGRAM PRODUCT FOR TAGGING CONTENT ON UNCONTROLLED WEB APPLICATIONS," which is a continuation of U.S. patent application Ser. No. 12/785,304, filed May 21, 2010, now U.S. Pat. No. 8,387,110. This application relates to U.S. patent application Ser. No. 12/785,278, filed May 21, 2010, now U.S. Pat. No. 9,071,650, entitled "METHOD, SYSTEM AND COMPUTER PROGRAM PRODUCT FOR ENFORCING ACCESS CONTROLS TO FEATURES AND SUBFEATURES ON UNCONTROLLED WEB APPLICATION," which claims priority from U.S. Provisional Application No. 61/303,191, filed Feb. 10, 2010. This application relates to U.S. patent application Ser. No. 12/562,032, filed Sep. 17, 2009, now U.S. Pat. No. 8,504,681, entitled "METHOD, SYSTEM, AND STORAGE MEDIUM FOR ADAPTIVE MONITORING AND FILTERING TRAFFIC TO AND FROM SOCIAL NETWORKING SITES," which claims priority from U.S. Provisional Application No. 61/097,698, filed Sep. 17, 2008, entitled "METHOD, SYSTEM, AND STORAGE MEDIUM FOR SOCIALWARE ARCHITECTURE". All applications listed in this paragraph are fully incorporated herein by reference.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

This disclosure relates generally to Web applications, and more particularly, to a system, method, and computer program product comprising instructions translatable for tagging content on uncontrolled Web applications in different modes, including a public mode and a professional mode.

BACKGROUND

Advances in communications technology often change how people communicate and share information. More recently, social networking sites are providing new ways for users to interact and keep others abreast of their personal and business dealings. The growth of social networking sites is staggering. New sites are emerging daily and new users are joining in droves. Today, social networking sites are being used regularly by millions of people around the globe, and it seems that social networking via websites will continue to be a part of everyday life at least in the United States.

The main types of social networking services provided by social networking sites are those which contain directories or categories, a means to connect with friends, and a means to recommend other individuals. For example, a social networking site may allow a user to identify an individual as a friend, a former classmate, or an uncle. The social networking site may recommend to the user another individual as a potential friend and also provide a personalized web page for the user to interact with those that the user has identified as "friends" via the social networking site.

Some social networking sites provide functions in the form of Web applications for members to create user profiles, send messages to other members who are their "friends," and personalize Web pages available to friends and/or the general public. Through these Web applications, social networking sites can connect people at low cost and very high efficiency. Some entrepreneurs and businesses looking to expand their contact base have recognized these benefits and are utilizing some social networking sites as a customer relationship management tool for selling their products and services.

For businesses and entities alike looking to embrace social networking sites as an additional method to exchange information between employees, clients, vendors, etc., the integration of social networking sites into their internal computing environments necessarily raises several critical concerns. What activities will people be allowed to be engaged in? What information may be disclosed and to what extent? Who is the information being disclosed to? Is malicious or otherwise damaging material being accessed or allowed onto the business's computers? How can a business manage the activities of particular users or groups?

Currently, there are no viable solutions to these difficult questions as businesses do not have control over Web applications and associated data provided by independent entities, including social networking sites own and operated by such independent entities. Some businesses have the means to block traffic to and from social networking sites. Some businesses can only hope that their employees are only using these social networking sites in the best interest of the company. There is no guarantee that the employees may police their own access to and participation at social networking sites and there is always the concern of an employee knowingly or unknowingly posting confidential information on a social networking site. Because of these risks, many businesses simply choose to deny their employees access to uncontrolled Web applications and forgo the efficiencies and cooperative gains that may come from embracing social networking sites.

SUMMARY

Traditionally, to the extent that a business or entity allows users within its computing environment access to the Internet, it has no ways of controlling, monitoring, and/or archiving communications between its users and Web applications that are not provided by the business or entity. This type of Web applications is referred to herein as uncontrolled Web applications as they are not controlled by the business or entity that operates the computing environment from where user requests for access are generated. For similar reasons, data originating from such uncontrolled Web applications is referred to herein as unstructured data.

Uncontrolled Web applications may come in various forms. One example of an uncontrolled Web Application may be an application running on a social networking site such as Facebook. In this example, data originating from Facebook would be referred to as unstructured data.

Embodiments disclosed herein provide a system, method, and computer program programming comprising one or more non-transitory computer readable storage media storing computer instructions for tagging content on uncontrolled Web Applications in different modes, including a public mode and a profession mode. In some embodiments, the functionality disclosed herein can be implemented as a middleware or proxy within or outside an enterprise computing environment.

In some embodiments, pages of uncontrolled Web applications are identified as they are accessed by users of an enterprise computing environment. In some embodiments, communications in the enterprise computing environment are programmatically inspected to identify traffic associated with uncontrolled Web applications. Unstructured data—including messages and application content—originating from such uncontrolled Web Applications is disassembled, analyzed, and categorized into structured data in various proprietary application element types. In some embodiments, these application element types may be source specific. An example of a source would be a social networking site operating on a public network such as the Internet. The application element types thus generated can then be utilized in a variety of ways to facilitate the entity operating the enterprise computing environment to, for instance, control, monitor, archive, categorize, and moderate communications between its users and social networking sites operating outside the entity's private network. In some embodiments, the whole process can be transparent to end users in the enterprise computing environment.

In some embodiments, the structured data corresponding to an uncontrolled Web application may be utilized to create a controlled version of the Web application. A user interface of the uncontrolled Web application may be modified with a selectable feature to allow a user to switch between the uncontrolled Web application and the controlled version of the Web application. In some embodiments, the dynamic creation of the controlled version of the Web application may be triggered by user selection of the selectable feature on the user interface. In some embodiments, the controlled version of the Web Application may have additional functionality configured for a particular purpose such as marketing, business networking, etc. In some embodiments, user interaction with the controlled version of the Web application is persisted and organized, for instance, in a database or a data repository, separate and independent from unstructured data originating from the uncontrolled Web application. In some embodiments, the persisted user interaction with the controlled version of the Web application may comprise contents and corresponding information such as tags associated therewith. In some embodiments, upon user selection to switch back to the uncontrolled Web application, no user activity may be recorded and/or tracked and no user interaction information may be stored in a database or data repository.

In some embodiments, the structured data corresponding to an uncontrolled Web application may be utilized to create a corresponding multi-mode Web application. The multi-mode Web Application may, in a first mode, appear and function substantially the same as the original uncontrolled Web Application with corresponding unstructured data originating therefrom. In some embodiments, the first mode may be referred to herein as the public mode. In a second mode, the multi-mode Web Application may have additional functionality configured for a target audience. In some embodiments, the second mode may be referred to herein as the professional mode. Additional modes are also possible, for instance, personal versus commercial modes, private versus public, etc.

In some embodiments, user interaction with the different modes of the Web application is persisted and organized, for instance, in a database or a data repository, separate and independent from unstructured data originating from the uncontrolled Web application. In some embodiments, the persisted user interaction with the different modes of the Web application may comprise contents and corresponding information such as tags associated therewith. In some embodiments, contents tagged in different modes may be organized in and associated with different applicant element types.

In some embodiments, the multi-mode Web Application may comprise a toggling functionality for an end user to switch between the modes. In some embodiments, the toggling functionality may be implemented as a single click function.

Because embodiments disclosed herein have the ability to inspect Web pages associated with uncontrolled Web applications and structure the unstructured data originating from the uncontrolled Web applications, it is not necessary for an entity operating a private network to block its users from accessing a social networking site or a Web page or function thereof. Further, embodiments disclosed herein have the ability to distinguish different types of user activities associated with accessing the uncontrolled Web applications, allowing the entity to isolate those activities and contents that should be monitored. In this way, it is possible for entities and enterprises alike to gain benefits that may come from embracing social networking sites without risking the downsides of allowing their users access to uncontrolled Web applications.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 9 is a screenshot of one example of a user interface through which an authorized user can perform various functions including specifying a role and social networking activities/actions allowed for this role;

FIG. 16 is a screenshot of a user interface implementing an embodiment disclosed herein.

DETAILED DESCRIPTION

Figure 1:
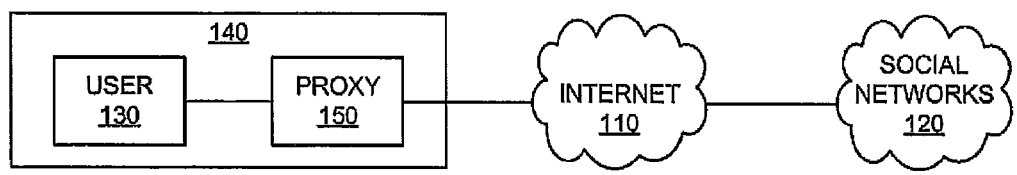
FIG. 1 depicts a simplified diagrammatic representation of a prior art architecture for network access control to social networking sites.

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on one or more computer-readable storage media. Within this disclosure, the term "computer-readable storage media" encompasses all types of data storage media that can be read by a processor. Examples of computer-readable storage media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Those skilled in the arts will recognize that the disclosed embodiments have relevance to a wide variety of areas in addition to the specific examples described below. For example, although the examples below are described in the context of employers and employees, some embodiments disclosed herein can be adapted or otherwise implemented to work in other types of relationships, circumstances, and places such as public libraries, parent-child, school-student, or any other place or relationship where it is desirable to monitor and protect network traffic to and from social networking sites.

FIG. 1 depicts a simplified diagrammatic example of how traditionally an entity or organization may monitor and protect network traffic to and from social networking sites. In this example, Company A may own and operate company network 140. Examples of company network 140 may include a local area network (LAN), an intranet—a private computer network within the organization, etc. User 130 of company network 140 may access Internet 110 via proxy 150. Social networking sites 120 may be generally accessible by users connected to Internet 110. As an example, social networks 120 may include, but are not limited to, Facebook®, LinkedIn®, Twitter®, MySpace®, Friendster®, Multiply®, Orkut®, Cyworld®, Hi5®, and others. All trademarks, service marks, and logos used herein are properties of their respective companies.

In some cases, proxy 150 of company network 140 may monitor and block all network traffic to and from one or more social networking sites 120 by way of a firewall implemented on proxy 150. As known to those skilled in the art, a firewall may be implemented as a part of a computer system or network that is designed to block unauthorized access while permitting authorized communications. A firewall may be implemented as a device or a set of devices configured to permit, deny, encrypt, decrypt, or proxy all incoming and outing network traffic between different domains based upon a set of rules and other criteria. Firewalls may be implemented in hardware, software, or a combination of both. Firewalls are frequently used to prevent unauthorized Internet users from accessing private networks connected to the Internet, especially intranets. Generally, all messages entering or leaving the intranet pass through the firewall, which examines each message and blocks those that do not meet the specified security criteria.

Proxy 150 represents a server computer that acts as an intermediary for requests from user 130 seeking resources from other servers, including those that reside outside of network 140. Those skilled in the art can appreciate that user 130 is a representation of a typical user in company network 140 and may include software and hardware utilized by the user to access company network 140 and Internet 110.

Figure 2:
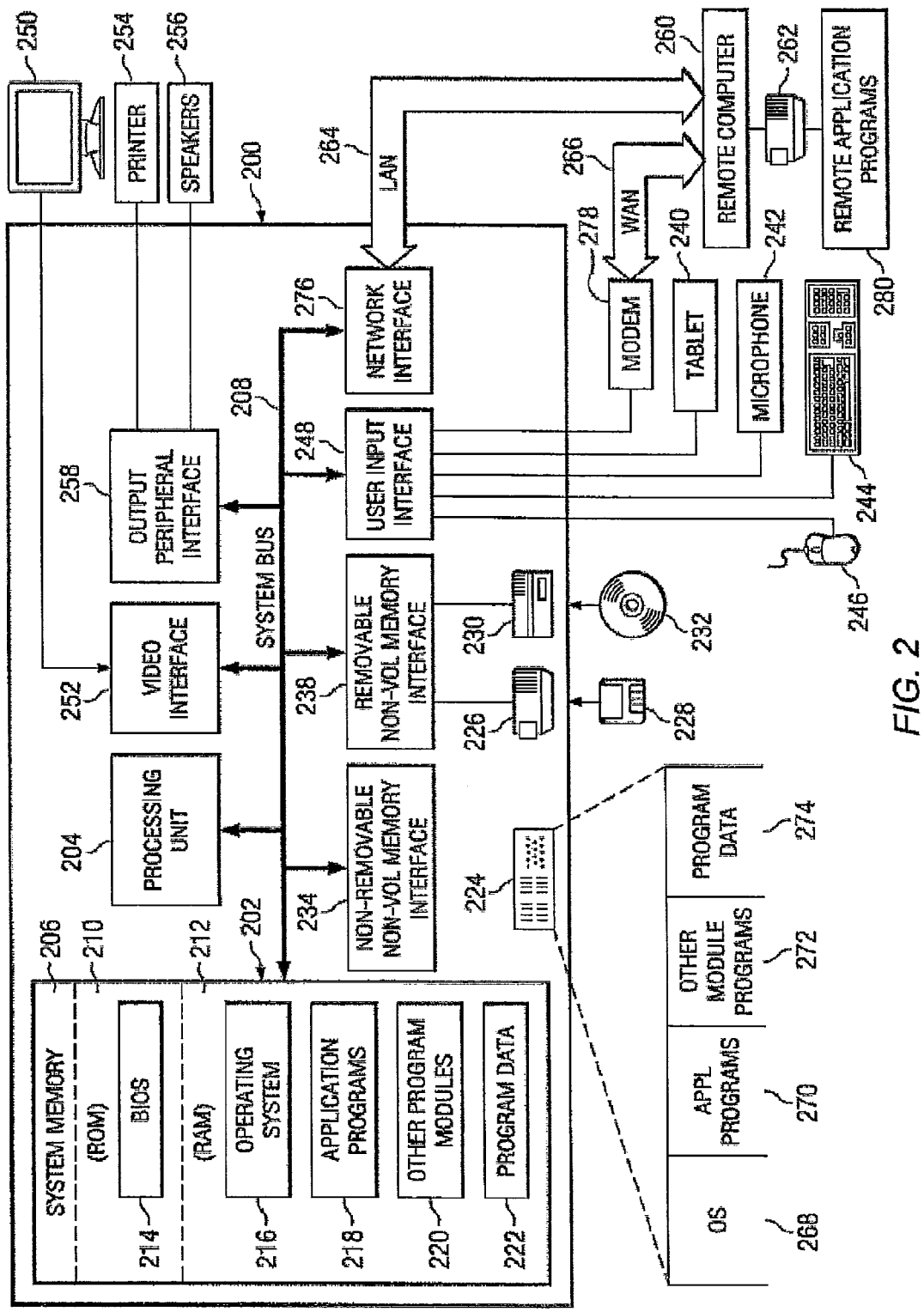
FIG. 2 depicts a diagrammatic representation of an exemplary computer system comprising at least one computer readable storage medium storing computer instructions implementing an embodiment disclosed herein.

FIG. 2 depicts an exemplary system within a computing environment where embodiments disclosed herein may be implemented. Components 202 of computing system 200 may include, but are not limited to, processing unit 204, system memory 206, and system bus 208. System bus 208 may couple various system components including system memory 206 to processing unit 204. System bus 208 may comprise any of several types of bus structures including a memory bus or memory controller, a peripheral bus, and a local bus using any of a variety of bus architectures.

Computing system 200 may include a variety of computer readable storage media. Computer readable storage media can be any available storage media that can be accessed by computing system 200. By way of example, and not of limitation, computer readable storage media may comprise volatile and nonvolatile storage media and removable and non-removable storage media. Computer readable storage media storing computer instructions implementing embodiments disclosed herein may be manufactured by known methods and materials and may rely on known programming languages and techniques for storage of information thereon. Examples of computer readable storage media may include, but are not limited to, random access memory (RAM), read only memory (ROM), EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 200.

In the example shown in FIG. 2, system memory 206 includes ROM 210 and RAM 212. ROM 210 may store basic input/output system 214 (BIOS), containing the basic routines that help to transfer information between elements within computing system 200, such as those used during start-up. RAM 212 may store data and/or program modules that are immediately accessible to and/or presently being operated on by processing unit 204. By way of example, and not of limitation, FIG. 2 shows RAM 212 storing operating system 216, application programs 218, other program modules 220, and program data 222.

Computing system 200 may also include other removable/non-removable, volatile/nonvolatile computer readable storage media that can be employed to store computer instructions implementing some embodiments disclosed herein. By way of example only, computing system 200 may include hard disk drive 224, a magnetic disk drive 226, and/or optical disk drive 230. Hard drive (HD) 224 may read from and write to non-removable, nonvolatile magnetic media. Disk drive 226 may read from and write to removable, nonvolatile magnetic disk 228. Optical disk drive 230 may read from and write to a removable, nonvolatile optical disk 232 such as a CD ROM or other optical medium. Other removable/non-removable, volatile/nonvolatile computer readable storage media are also possible. As illustrated in FIG. 2, hard drive 224 may be connected to system bus 208 via a non-removable memory interface, such as interface 234, and magnetic disk drive 226 and optical disk drive 230 may be connected to system bus 208 via a removable memory interface, such as interface 238.

The drives and their associated computer readable storage media, discussed above, may provide storage of computer readable instructions, data structures, program modules and other data for computing system 200. For example, hard disk drive 224 may store operating system 268, application programs 270, other program modules 272 and program data 274. Note that these components can either be the same as or different from operating system 216, application programs 218, other program modules 220, and program data 222.

A user may enter commands and information into computing system 200 via input devices such as tablet or electronic digitizer 240, microphone 242, keyboard 244, and pointing device 246. Pointing device 246 may comprise a mouse, a trackball, and/or a touch pad. These and other input devices may be connected to processing unit 204 via user input interface 248. User input interface 248 may be coupled to system bus 208 or via other interface and bus structures, such as a parallel port, a game port, or a universal serial bus (USB).

Monitor or other type of display device 250 may be connected to system bus 208 via an interface, such as a video interface 252. Monitor 250 may also be integrated with a touch-screen panel or the like. Note that the monitor and/or touch screen panel can be physically coupled to a housing in which computing system 200 is incorporated, such as in a tablet-type personal computer. Computing system 200 may comprise additional peripheral output devices such as speakers 256 and printer 254, which may be connected via an output peripheral interface 258 or the like.

Computing system 200 may operate in a networked environment and may have logical connections to one or more remote computers, such as remote computing system 260. Remote computing system 260 may be a personal computer, a server, a router, a network PC, a peer device or other common network node. Although only a memory storage device 262 is shown in FIG. 2, remote computing system 260 may include many or all of the components and features described above with reference to computing system 200.

Logical connections between computing system 200 and remote computing system 260 may include local area network (LAN) 264, connecting through network interface 276, and wide area network (WAN) 266, connecting via modem 278. Additional networks may also be included.

Embodiments disclosed herein can be implemented to run on various platforms operating under system software such as IBM OS/2®, Linux®, UNIX®, Microsoft Windows®, Apple Mac OSX® and others in development or commercially available. The functionality disclosed herein may be embodied directly in hardware, in a software module executed by a processor or in any combination of the two. Furthermore, software operations may be executed, in part or wholly, by one or more servers or a client's system, via hardware, software module or any combination of the two. A software module (program or executable) may reside on one or more computer readable storage media described above. In FIG. 2, an exemplary storage medium is coupled to the processor such that the processor can read information from, and write information to, the storage medium. In the alternative, the storage medium may be integral to the processor. The processor and the storage medium may also reside in an application specific integrated circuit (ASIC). The bus may be an optical or conventional bus operating pursuant to various protocols that are known to those skilled in the art.

In an illustrative embodiment, computer instructions implementing some embodiments disclosed herein may comprise lines of compiled Java, or other language code. Other architectures may be used. In the hardware configuration above, various software components may reside on any single computer or on any combination of separate computers. In some embodiments, some or all of the software components may reside on the same computer. In some embodiments, the functions of any of the systems and methods may be performed by a single computer. In some embodiments, different computers than are shown in FIG. 2 may perform those functions. Additionally, a computer program or its software components with such code may be embodied in more than one computer readable medium in more than one computer.

Figure 3:
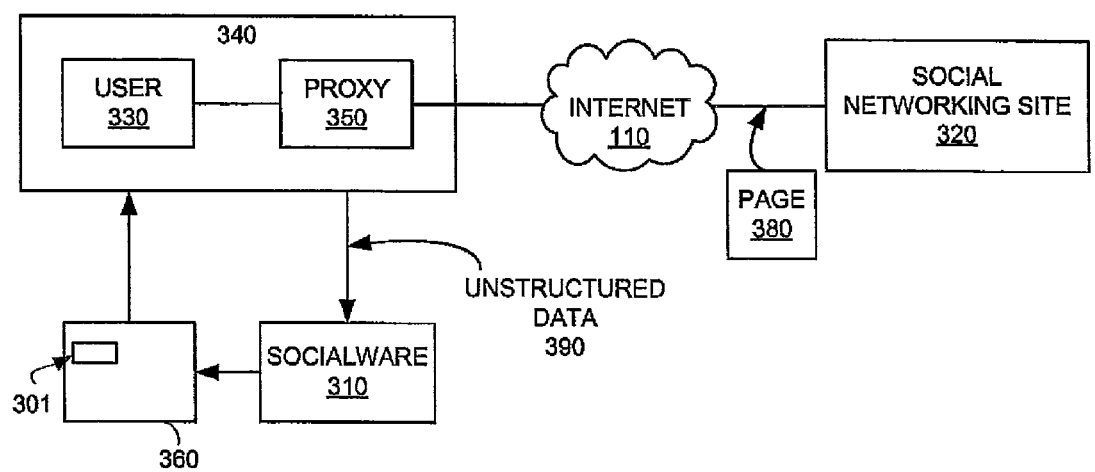
FIG. 3 depicts a diagrammatic representation of a high level network architecture for network access control to social networking sites, implementing an embodiment disclosed herein.

FIG. 3 depicts a diagrammatic representation of how an entity or organization implementing an embodiment disclosed herein may monitor and protect network traffic to and from social networking sites. In this example, Company B may own and operate social networking site 320 independent of Company A which owns and operates enterprise computing environment 340, also referred to herein as company network 340, private network 340, internal network 340 or simply network 340. Company A may represent an entity. Examples of such an entity may include, but are not limited to, an enterprise, a business, a company, a school, a hospital, a library, a government agency, an office, a home, and so on. End user 330 may represent any individual in a public or private office, government, home, or school setting and may include software and hardware necessary for accessing network 340 and Internet 110. End user 330 may utilize a computing device to bi-directionally connect to Internet 110 where social networking site 320 resides. Communications media that may facilitate such bi-directional connections may include an intranet, a virtual private network ("VPN"), and/or a wireless network, etc.

Company B may comprise hardware, software, infrastructure, and people necessary to operate and maintain social networking site 320. Social networking site 320 may be implemented in a manner known to those skilled in the art. As a specific example, a user may log in to social networking site 320 via a browser application or via a mobile application running on the user's wired or wireless computing device. Examples of a wireless computing device may include, but are not limited to, a laptop computer, a personal digital assistant (PDA), a mobile phone, an Internet enabled mobile device, and so on.

Figure 4:
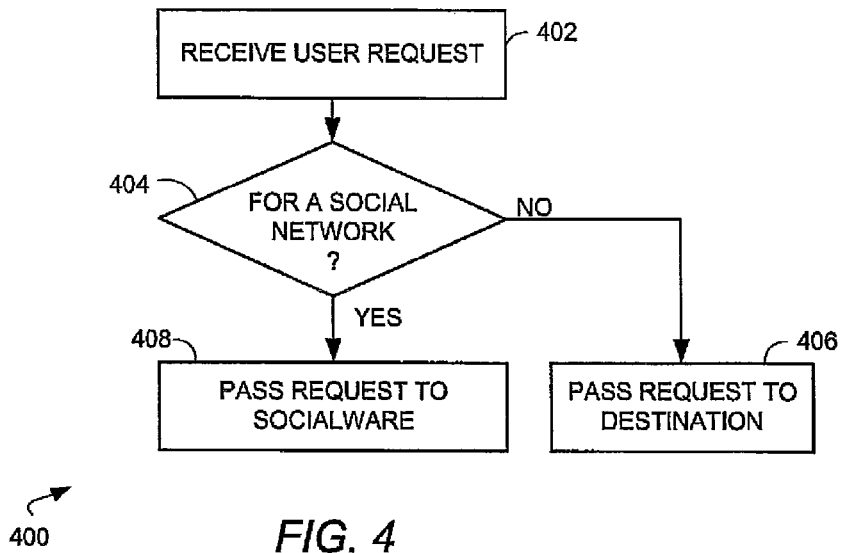
FIG. 4 depicts a flow diagram illustrating how a proxy server may function as a gateway or intermediary between an end user and a social networking site.

In the example of FIG. 3, proxy 350 resides within network 340 and is bi-directionally coupled to end user 330 via a wired or wireless internal network connection. Proxy 350 may be communicatively coupled to social network 320 over Internet 110. In some embodiments, proxy 350 may function as a gateway or intermediary between end user 330 and social networking site 320. More specifically, proxy 350 may be responsible for receiving all incoming requests from and sending corresponding responses to end user 330. As illustrated in FIG. 4, in some embodiments of flow 400, proxy 350 may operate to receive a user request from user 330 (step 402), determine whether that request contains a destination pertaining to a social networking site (step 404), and either pass the request from user 330 that is destined to a social networking site to Socialware 310 for processing (step 408) or pass the request to the destination (step 406) if it is not destined to a social networking site.

As will be described further below, in some embodiments, Socialware 310 may operate to process a request from user 330 for page 380 from social networking site 320, obtain the requested page (the original application data) from social networking site 320, determine if any modification to the original application data (shown in FIG. 3 as unstructured data 390) would be necessary per Company A's policy as applied to user 330, prepare corresponding page 360 that includes any necessary feature-level modifications 301 to the original application data provided by social networking site 320, and return modified page 360 to proxy 350 or user 330 as a response to the request from user 330. In some embodiments, other than certain feature(s) being disabled or unavailable to user 330, page 360 may be substantially the same as the original page requested from social networking site 320.

Within this disclosure, features/subfeatures of an uncontrolled application refer to components/subcomponents of the uncontrolled application. In some embodiments, a feature or subfeature of an uncontrolled application may be a function that allows a user to take a certain action via the uncontrolled application. Non-limiting examples of features may include status update, wall post, messaging, chat, photo upload, commenting, and so on. Non-limiting examples of subfeatures may include functions involved when using a feature. For example, a "like" button associated with the status update feature may be considered as a subfeature. Moreover, certain features/subfeatures may be common to two or more social networking sites. Status update may be one example feature that is common to many social networking sites.

In some embodiments, Socialware 310 may reside within network 340. In some embodiments, Socialware 310 may operate outside of network 340. In some embodiments, Socialware 310 may be implemented as a service to proxy 350 or network 340. In some embodiments, Socialware 310 may be implemented as part of proxy 350. Some embodiments may be implemented without proxy 350. For example, when user 330 sends, via a browser application running on a computing device of user 330, a request for a page from social networking site 320, the domain name server (DNS) may redirect the user request to Socialware 310. Socialware 310 may process the user request, obtain the requested application data from social networking site 320, structure the unstructured application data, prepare modified page 360 if necessary according to a set of predetermined access control rules, and return an appropriate response to user 330.

Figure 5:
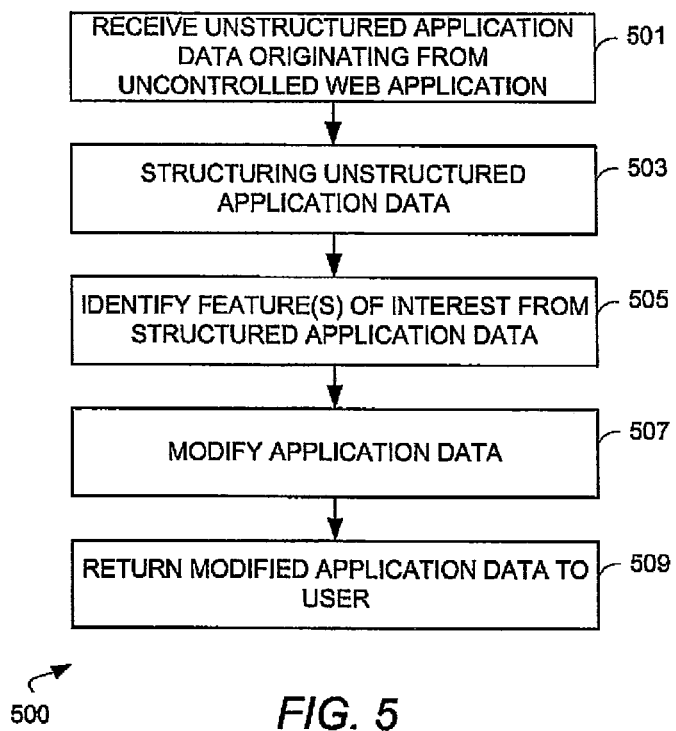
FIG. 5 depicts a flow diagram illustrating an example of a method of processing application data from an uncontrolled Web application according to one embodiment disclosed herein.

Referring to FIG. 5, flow 500 represents an example of how Socialware 310 may facilitate in enforcement of access control to features, including subfeatures, provided by uncontrolled Web applications. At step 501, in some embodiments, unstructured application data originating from an uncontrolled Web application may be received at a computer implementing Socialware 310. In some embodiments, the unstructured application data originating from the uncontrolled Web application may be provided to Socialware 310 by social networking site 320. In some embodiments, the unstructured application data originating from the uncontrolled Web application may be forwarded to Socialware 310 through proxy 350.

Social networking sites may run on different platforms and utilize different programming languages, including AJAX, HTML, JSON, XML. Extensible markup language (XML), asynchronous JavaScript and XML (AJAX), Hypertext Markup Language (HTML), and JavaScript Object Notation (JSON) are known to those skilled in the art and thus are not further described herein. Thus, responses from social networking sites may contain application data in various formats/languages. One example of such application data originating from an uncontrolled Web application may be that of a user's home page at a social networking site.

Specifically, a user may direct a browser application running on the user's computing device to the social networking site, by putting the social networking site's Universal Resource Locator (URL) address in the address bar of the browser application or pointing to a link to the social networking site. The social networking site may present a login screen to the user, asking the user to provide the user identification (ID) and password. After the user enters the required login information, the browser application may send a request containing the user ID and password to the social networking site. In response, the social networking site may return the user's home page in the form of a dynamically assembled Web page document.

A dynamic Web page is a hypertext document rendered to a World Wide Web user, presenting content that has been customized for that user or content that continually updates as the page is displayed to the user. One example of such a home page may be "home.php?" with Hypertext Preprocessor (PHP) code embedded into a source document in HTML. Other scripting language such as JavaScript may also be used.

Figures 6A, 6B, 6C:
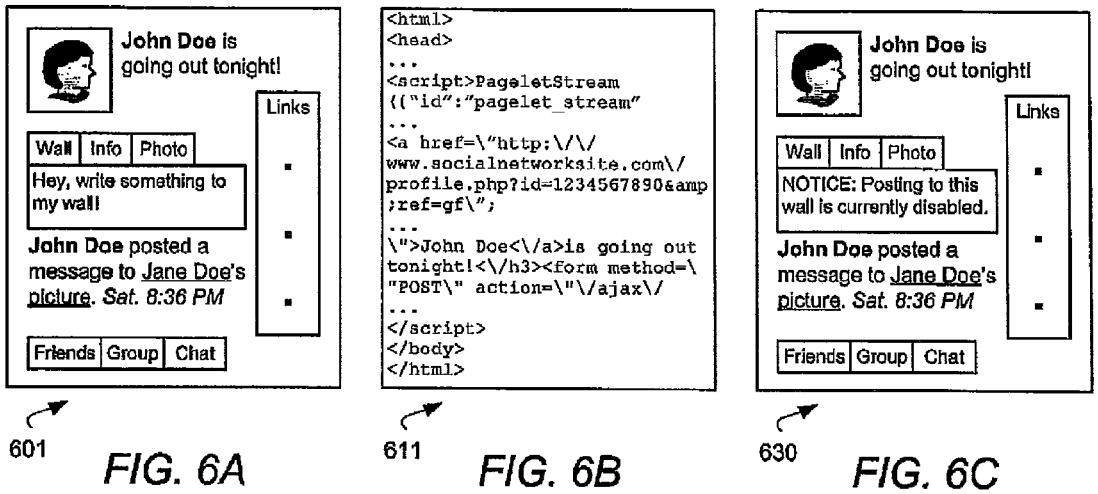
FIG. 6A depicts a simplified diagrammatic representation of a user's home page at a fictional social networking site.
FIG. 6B depicts a portion of source code corresponding to the user's home page shown in FIG. 6A.
FIG. 6C depicts a simplified diagrammatic representation of the user's home page modified to disable a particular feature of the social networking site.

FIG. 6A depicts a simplified diagrammatic representation of a user John Doe's home page 601 at a fictional social networking site "www.socialnetworksite.com". FIG. 6B depicts a portion of source code 611 corresponding to home page 601. Scripting languages such as PHP and JavaScript are known to those skilled in the art and thus are not further described herein.

The source code corresponding to the hypertext document originating from social networking site 320 is considered by network 340 as unstructured. As mentioned above, responses from social networking sites may contain application data in various formats/languages. In addition to the inability to properly analyze application data originating from social networking sites, businesses and other entities alike typically do not have any control over social networking sites. Thus, it can be very difficult to understand the application data originating from social networking sites, find features or components of interest contained therein, and modify the same for access control purposes.

In some embodiments, the types of information that would be useful for controlling access to features or application components may first be defined on a source-by-source basis. Within this disclosure, a source refers to a social networking site or any external, third party network site identified by an entity that owns and operates network 340. Within this disclosure, social networking site 320 exemplifies such an external, third party Web application. These external Web applications may run on different operating systems/platforms. Socialware 310 may have no control over these Web applications. Socialware 310 may also have no control over applications running within network 340.

In some embodiments, the types of information that would be useful for controlling access to features or application components may include, but are not limited to, the following:

broadcasts;
actions;
profile; and
directed messages.

Within each feature type, there may be subtypes (subfeatures). For example, the subtypes of broadcasts may include wall posts, tweets, status updates, etc. The subtypes of actions may include adding a friend, making a recommendation, searching a friend, a word, a page, an event, and so on. The subtypes of profile may include name, location, hobbies, links, etc. The subtypes of directed messages may include private messages, group mail, Web based mail, etc. Each source or social networking site would have a distinct set of features or application components (including subfeatures or subcomponents), one or more of which may be of interest to Company A for the purpose of controlling accesses thereto by users of network 340. In some embodiments, the definitions or specifications of source-specific features and subfeatures are maintained in a centralized location such as a library or a database that is accessible by Socialware 310.

Referring back to FIG. 5, in some embodiments, Socialware 310 may operate to examine the unstructured application data originating from the uncontrolled Web application, identify each specific type of information contained in the application data, and log those pieces of information in an info table (step 503). Some embodiments of a method of structuring unstructured data originating from an uncontrolled Web application are further described below with reference to FIGS. 9-12. In some embodiments, one or more features or application components of interest may be identified in the info table (step 505). In some embodiments, Socialware 310 may operate to modify the unstructured application data originating from the uncontrolled Web application (step 507) and return the modified application data (step 509). FIG. 6C depicts a simplified diagrammatic representation of modified page 630.

As it can be seen from FIGS. 6A and 6C, original page 601 and modified page 630 are substantially the same, except a particular feature of interest—wall post—has been disabled in modified page 630. In this example, it is the type of the feature that is disabled, so not only John Doe cannot make a wall post to his wall or his friend's wall, but also his friends cannot post to his wall. Notice that the status update feature was not disabled, so original page 601 and modified page 630 both show the same status update indicating a previous post by John Doe about his friend Jane Doe's picture.

In some embodiments, steps 503-507 may be implemented utilizing filters. Within this disclosure, a filter comprises a piece of code that is designed to recognize a particular portion of an application-level dynamic protocol. Hypertext Transfer protocol (http) is an example of an application-level protocol. Unlike defined or otherwise standardized protocols such as those used in e-mail communications and instant messaging, dynamic protocols used by social networking sites may change over time, be undefined, and/or vary from site to site. Dynamic protocols are known to those skilled in the art and techniques for parsing network traffic in such protocols are also known to those skilled in the art.

In some embodiments, Socialware 310 may comprise various filters for parsing and access control. Below is an example of a filter for parsing an example HTML message from a social networking site known as Facebook.

```
Filter 1 - Parse HTML Message void parse(String payload) {
    HTMLDoc doc = HTMLDoc.parse( payload );
    HTMLElement element = doc.findByClass( "message" );
    String message = element.text( );
    return message;
}
```

Socialware 310 may further comprise various filters for content control and for understanding how, when, and what application external to network 340 is changing, and/or what type of change is involved. It could be a functional change, a layout change, a message format change, etc. For example, some embodiments may implement one or more of the following non-limiting types of filters:

1) Access control filters. These filters manipulate the code of a Web application to enable and disable access to certain features depending on who the accessing user is.
2) Data archiving filters. These filters record information as it is transmitted across the wire. This may be information that is posted to social networks, or retrieved from social networks.
3) Data security filters. These filters monitor information as it is published to social networks. If data is deemed private or sensitive (by a Data Leakage Protection system or otherwise), the user will be sent a notification that they are not allowed to post that information.
4) Secure messaging filters. These filters trap information before it is able to post to a social network and store it internally. The message is replaced or otherwise substituted with a placeholder that is sent to the social network. If a user is sent the message with the placeholder, Socialware 310 will remove the placeholder and display the original message. In some embodiments, Socialware 310 is implemented as a middleware. In some embodiments, Socialware 310 is implemented in an appliance.
5) Notification Filters. These filters notify the user of certain information. For example, a company watermark may be placed onto a social network, informing a user of the company usage policy.

Below are non-limiting examples of various types of Socialware filters written for the example social networking site Facebook.

1) Access control filter, to disable Facebook chat:

```
void process(String page, User user) {
    HTMLDoc doc = HTMLDoc.parse( page );
    if (user.canAccessFacebookChat( ) == false) {
        doc.findById( "chat" ).delete( );
    }
}
```

2) Data archiving filter, to record Facebook chat:

```
void process(String page, User user) {
    HTTPPost post = HTTPPost.parse( page );
    String fromUsername = post.getParam( "fromUser" );
    String toUsername = post.getParam( "toUser" );
    String message = post.getParam( "message" );
    DataStore.record( fromUser, toUser, message );
}
```

3) Data security filter, to block credit card numbers from posting to Facebook walls:

```
void process(String page, User user) {
    HTTPPost post = HTTPPost.parse( page );
    String wallPost = post.getParam( "wall_post" );
    if ( ContainsCreditCardNumber( wallPost ) == true ) {
        ReturnErrorToUser( );
    } else {
        AllowMessageToPost( );
    }
}
```

4) Secure messaging filter, to replace Facebook wall post messages with a placeholder:

```
// When posting a facebook wall post
void process( String page, User user ) {
    HTTPPost post = HTTPPost.parse( page );
    String message = post.getParam( "wall_post" );
    String placeholder = GetPlaceholder( message );
    post.setParam( "wall_post" );
    // update the page with the new placeholder instead of message
    page = post.toString( );
}
// When viewing a wall message
void process( String page, User user ) {
    String placeholder = GetPlaceholder( page );
    String message = GetMessage( placeholder );
    // replace the placeholder with the original message
    page.replace( placeholder, message);
}
```

5) Notification Filters, add a watermark to Facebook

```
void process( String page, User user ) {
    HTMLDoc doc = HTMLDoc.parse( page );
    // Insert new HTML code for the watermark
    doc.addElement ( GenerateFacebookWatermark( ) );
    page = doc.toString( );
}
```

One skilled in the art will appreciate that other types of filters are also possible and that these filters would be source-specific and may vary from implementation to implementation.

Figure 7:
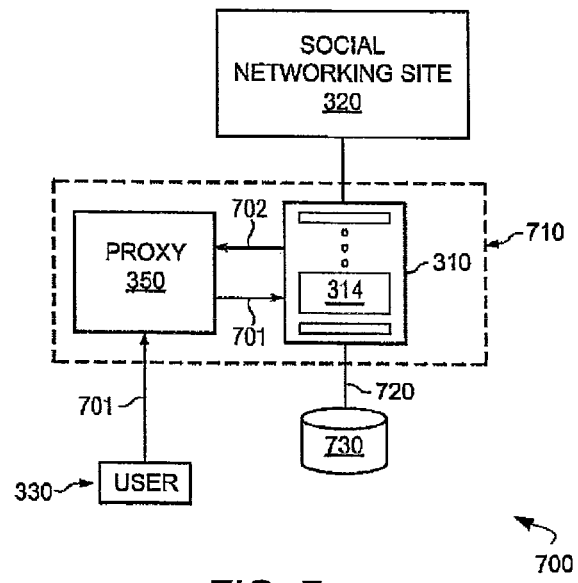
FIG. 7 depicts a diagrammatic representation of one embodiment of a system for network access control to social networking sites.

FIG. 7 depicts a diagrammatic representation of one embodiment of system 700 for network access control to social networking sites. System 700 may comprise Socialware 310 and database 730. Socialware 310 may comprise a plurality of source-specific filters 314 as described above. In some embodiments, proxy 350 and Socialware 310 may be part of middleware 710. In some embodiments, middleware 710 may monitor traffic to and from user 330 in network 340. Request 701 from user 330 may be received by proxy 350 and forwarded to Socialware 310 if request 701 is destined for a social networking site such as social networking site 320. Response 702 from Socialware 310 may contain modified page 630 as described above with reference to FIGS. 5-6C. Socialware 310 may save the information from processing the application data originating from social networking site 320 in Info Table 720 which is then stored in database 730.

Referring to FIGS. 6A-C, as a specific example, filters 314 may comprise an access control filter for blocking wall posts by John Doe and to his wall on the social networking site "www.socialnetworksite.com". This source-specific access control filter may parse source code 611 to search for a portion of source code 611 pertaining to the "wall post" feature as follows:

```
<div id = "wall post">
    <input id = "content">
</div>
```

When such a feature is found, the access control filter may add or modify as follows:

```
<img src = "blocked">
    <input id = "content", enable = false>
```

As an even more specific example, suppose source code 611 contains the following piece of code:

```
<div class = "wall post">
    <h1>Hey, write something to my wall!</h1>
</div>
```

The access control filter recognizes "wall post" as a feature of interest as defined in the centralized library or database. If user 330 is not allowed to access the "wall post" feature, the access control filter may operate to disable it by deleting, replacing, or modifying the portion of source code 611 pertaining to the "wall post" feature and/or the content of the wall post. In the example of FIG. 6C, the original message is deleted and replaced with a message "NOTICE: Posting to this wall is currently disabled" by Socialware 310.

In some embodiments, the source-specific access control filters may be utilized in conjunction with other types of filters described above. Company A may have a set of policy rules pertaining to its users and third party social networking sites. Depending upon these policy rules, different sets of filters may be applied to different users with respect to different social networking sites to control access to different features and/or subfeatures on those social networking sites. For example, at run time, a chain of filters from filters 314 comprising Filter 1, Filter 2, Filter 3, and Filter 4 may be utilized by Socialware 310 to process request 701. Filter 1 may operate to parse a response from social networking site 320 in a similar manner as described above with respect to the example social networking site. Filter 2 may operate to structure and block the chat function or feature and its data as well as to record any chat data contained in the response from social networking site 320. Filter 3 may operate to structure and block the wall post feature or function of social networking site 320. Filter 4 may operate to place a control bar or function within the page. The results from these filters are then used to prepare modified page 630. In the example of FIG. 7, modified page 630 is then sent to proxy 350 in the form of response 702. Information associated with this particular operation, including what features to look for, how to get those features, and what formats to use, is placed in Info Table 720 and stored in database 730.

Some embodiments of Socialware 310 and/or middleware 710 described above may be implemented on one or more machines owned and operated by an entity independent of and external to network 340. In some embodiments, Socialware 310 and/or middleware 710 described above may be implemented in a distributed computing architecture, with some of the functions of Socialware 310 and/or middleware 710 described above being implemented in network 340 and some outside of network 340.

Figure 8:
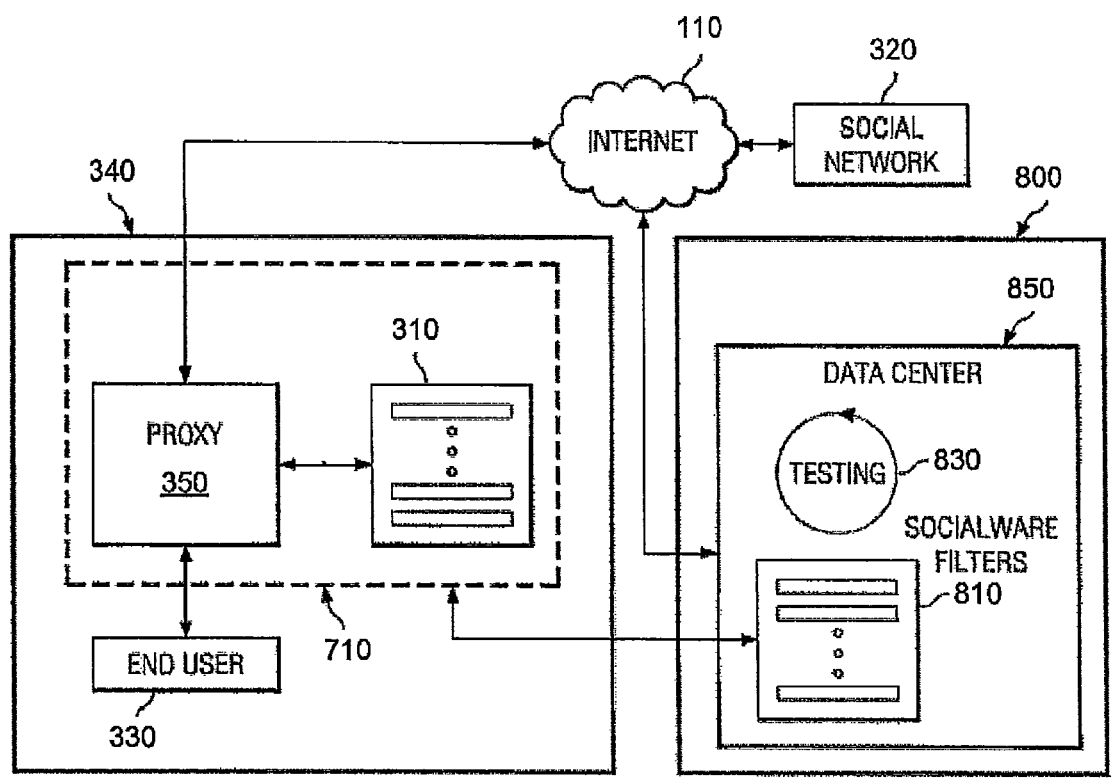
FIG. 8 depicts a diagrammatic representation of a system architecture for network access control to social networking sites, implementing an embodiment disclosed herein.

FIG. 8 depicts a diagrammatic representation of a distributed computing architecture for network access control to social networking sites, implementing an embodiment disclosed herein. Following the above example, Data Center 850 may be owned and operated by a company independent of Company A (and hence network 340) and Company B (and hence social network 304). For example, in one embodiment, Data Center 850 may be owned and operated by Company 800. Data Center 850 may comprise one or more machines, each having at least one computer readable storage medium. The at least one computer readable storage medium may store computer instructions implementing testing functionality 830. The at least one computer readable storage medium may also store Socialware filters 810.

In some embodiments, middleware 710 or Socialware 310 may be communicatively coupled to Data Center 850 over a public network such as Internet 110. In some embodiments, Socialware 310 may comprise Socialware filters 314. In some embodiments, Socialware filters 314 may be stored on one or more computer readable storage media within network 340.

In some embodiments, Socialware filters 314 that are used by Socialware 310 in network 340 may be continuously updated by Data Center 850, perhaps over a network such as Internet 110. Maintenance of Socialware filters 314 may comprise testing Socialware filters 810 utilizing testing functionality 830 at Data Center 850. Socialware filters 314 may comprise all or a portion of Socialware filters 810.

In some embodiments, testing functionality 830 may comprise a test driver written to cause a real-time test signal to be passed through a particular filter. If the filter does not produce the correct result, it is broken. When a filter is broken, Data Center 850 and/or an application thereof will be notified. A user at Data Center 850 reviews the filter, analyzes the signal, and determines what caused the filter to break down, and modify the filter accordingly. Socialware 310 is updated in real-time or near real-time with the updated filter. For additional details on adaptive monitoring and filtering traffic to and from social networking sites, readers are directed to U.S. patent application Ser. No. 12/562,032, filed Sep. 17, 2009, entitled "METHOD, SYSTEM, AND STORAGE MEDIUM FOR ADAPTIVE MONITORING AND FILTERING TRAFFIC TO AND FROM SOCIAL NETWORKING SITES."

In some embodiments, some or all Socialware filters 314 may be defined by Company A and maintained/updated by Data Center 850. Company A may comprise rules on how to apply Socialware filters 314. These rules link transmissions to filters. For example, a rule may operate to examine the URL a user is accessing, and determine if that URL corresponds to a particular filter. If so, that filter will be placed on the transmission. Rules may be stored on a network server or a storage medium accessible by the server.

In some embodiments, middleware 710 may comprise at least one non-transitory computer readable storage medium storing Socialware filters 314 and software and/or hardware components for communicating with enterprise applications, social networking site applications, and Data Center 850. In some embodiments, middleware 710 may further comprise one or more processors for translating instructions stored on the computer readable storage medium. In some embodiments, those instructions may include providing a set of services to a server such as proxy 350 that handles all incoming and outgoing traffic for network 340. As shown in FIG. 8, in some embodiments, proxy server 350 may be part of middleware 710. In some embodiments, proxy server 350 may be connected to a plurality of users, including user 330, in network 340.

In some embodiments, Socialware 310 may use user/group defined roles and permissions to allow and restrict end user activity for social networks. In some embodiments, Socialware 310 may comprise a user interface having a plurality of functions through which an authorized user such as an administrator can specify organizational roles and each role's access to specific social networking activities/features. FIG. 9 is a screenshot of one example of user interface 900 through which an authorized user can perform various functions including specifying a role and social networking activities/actions for one or more social networking sites that are allowed for this role.

In some cases, more than one user can be assigned to a role. For example, an administrator may define a group to act in a particular role and assign individual users or workstations to the group. Since each role is associated with a set of social networking activities/actions, a user's access thereto can be effectively controlled or otherwise affected by his belonging to the group. As illustrated in FIG. 9, in some embodiments, control of access to social networking activities/features can be applied in this manner across multiple social networking sites.

In some embodiments, users and/or workstations may be added or removed from an existing group. Furthermore, allowed and/or restricted activities/actions can be modified for existing groups. In some embodiments, Socialware 310 may store administrative settings in database 720. Examples of administrative settings may include information on a role and allowed/restricted social networking activities/actions associated therewith.

In some embodiments, when end user 330 attempts to access social networking site 320, middleware 710 and/or proxy 350 may intercept the traffic from end user 330 and requests Socialware 310 to verify that end user 330 is authorized to access social networking site 320. In some embodiments, when a HTTP post or request is received, Socialware 310 may identify what user/workstation initiated the post or request and identify the permitted/restricted actions or activities. Utilizing filters 314, Socialware 310 may identify the specific activity contained in the post or request. If the activity is allowed, Socialware 310 may permit the activity to take place by not blocking the activity; however, if the activity is not allowed, then Socialware 310 may operate to block the activity by modifying the original application data to delete or otherwise disable the non-permitted activity. In some embodiments, the initiating user/workstation may be shown a message explaining that the activity has been blocked because the user/workstation does not have the proper permissions to execute the desired action. In some embodiments, Socialware 310 may first identify the feature or function enabling the specific activity contained in the post or request. In some embodiments, Socialware 310 may first identify the user/workstation who initiated the post or request.

Figure 10:
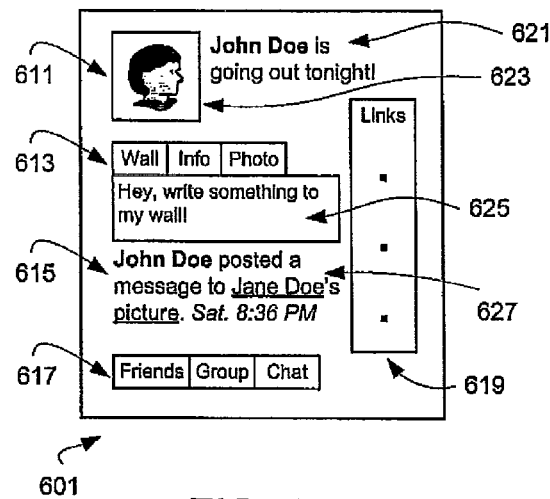
FIG. 10 depicts a simplified diagrammatic representation of a Web page with unstructured data originating from a social networking site.

Referring to FIG. 5, in some embodiments, Socialware 310 may operate to examine unstructured data originating from an uncontrolled Web application, identify each specific type of information contained in the original data, and log those pieces of information in an Info Table (step 503). FIG. 10 depicts a simplified diagrammatic representation of page 601 originating from a social networking site. Page 601 may contain areas 611, 613, 615, 617, 619, each of which may comprise at least a feature, a function, or a combination thereof. For example, area 611 may include profile feature 623 which allows user John Doe to upload a picture representing himself (sometimes referred to as a "profile picture.") Profile feature 623 may include subfeature 621 which shows the user's latest status as posted to wall 625 by the user.

Area 613 may contain a plurality of tabs, each of which is associated with a particular function embedded in page 601. Example functions may include a wall post application, an information gathering module, and a photo library or database manager.

In the example shown in FIG. 10, John Doe has written on his wall 625 a post containing the text: "Hey, write something to my wall!" but this post has not been sent to the social networking site for posting on wall 625. As described above, if John Doe is not allowed to access this "wall post" feature, even if John Doe sends his post to the social networking site and the social networking sites sends back a response containing his post, an access control filter may operate to disable it by deleting, replacing, or modifying the portion of source code 611 pertaining to the "wall post" feature and/or the content of the wall post, as shown in FIG. 6C.

As another example, area 615 may contain a real time feed that may be dynamically updated by the social networking site hosting page 601. In this example, area 615 contains information about user John Doe's latest post to another user Jane Doe as well as dynamic link 627 referencing another page containing the actual content of John Doe's latest post. Area 617 may contain additional features or functions such as a Friends application that allows John Doe to search and add "friends" and to manage "friendships" with these "friends" accordingly, a Group application that allows John Doe to create and manage groups of "friends", and a Chat application that allows John Doe to chat with his "friends" via the social networking site in real time no matter where they are.

As yet another example, area 619 may contain a plurality of links to other Web pages associated with or referred to by the social networking site hosting page 601. Within the context of this disclosure, data associated with Web pages from the social networking site hosting page 601 as well as data associated with other Web pages referred to by the social networking site are referred to herein as unstructured data.

Figure 11:
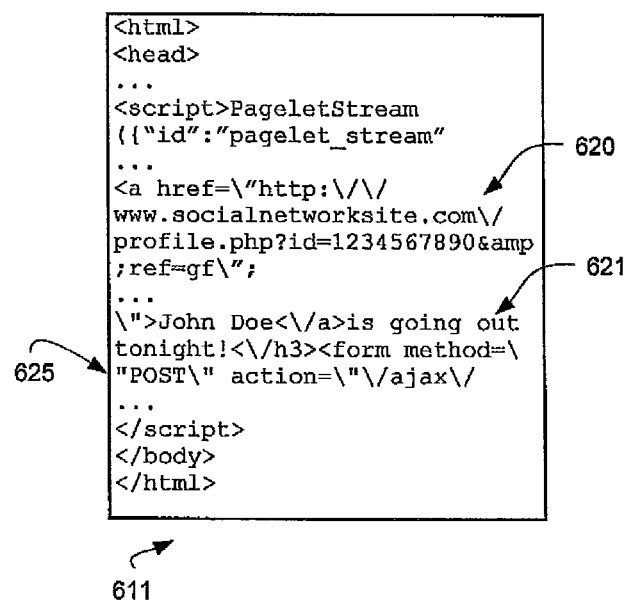
FIG. 11 depicts a portion of source code corresponding to a portion of the unstructured data of the Web page shown in FIG. 10.

FIG. 11 depicts a portion of source code 611 corresponding to a portion of the unstructured data of Web page 601 shown in FIG. 10. In this example, source code 611 contains reference 620 showing that Web page 601 comprises an html document hosted by a social networking site having a domain name "socialnetworksite.com". The html document contains a JavaScript "PageletStream". Such a JavaScript can be run in a browser environment on a user device associated with John Doe to dynamically display, and to allow the user to interact with, the information presented via Web page 601. Typically, neither the browser running on the user device nor the private network where the user device resides can control any feature or function embedded in Web page 601 originating from outside of the private network.

Figure 12:
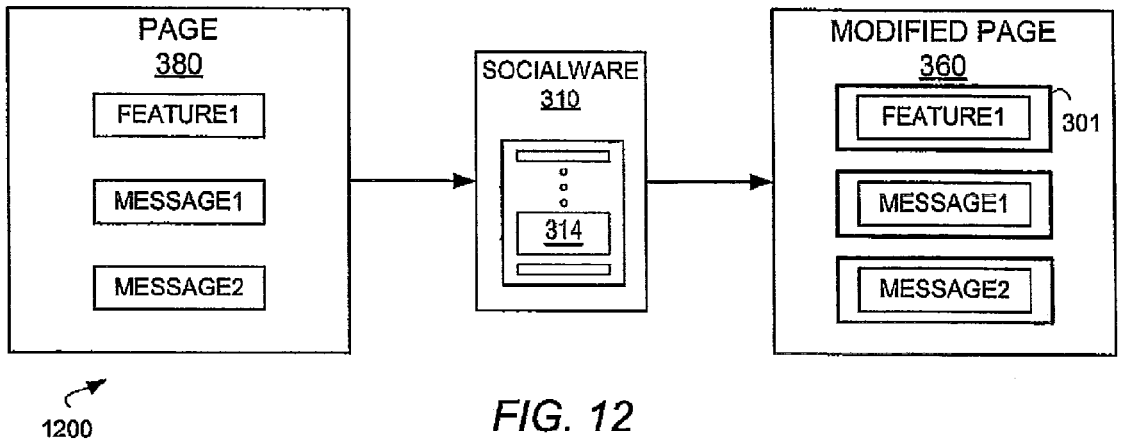
FIG. 12 depicts a diagrammatic representation of one embodiment of a process in which unstructured data originating from an uncontrolled Web application is structured and a modified page is generated utilizing the structured data.

FIG. 12 depicts a diagrammatic representation of one embodiment of a process in which unstructured data originating from an uncontrolled Web application is structured and a modified page is generated utilizing the structured data. In some embodiments, as users in a private network accessing a public network such as the Internet, communications in the private network may be programmatically inspected to identify traffic associated with uncontrolled Web applications on the Internet. A typical response from a source outside of a private network may comprise html page 380 containing a JavaScript for presenting Feature1, Message1, and Message2 to a user in the private network. In some embodiments, this source may be a social networking site operating on the Internet. As an example, Feature1 may be a wall post application, Message1 may be a post by the user requesting page 380, and Message2 may be a post by a "friend" of the user on the social networking site.

In some embodiments, process 1200 may comprise processing page 380 and generating modified page 360. In some embodiments, processing page 380 may comprise analyzing unstructured data associated with page 380 and identifying application element types from the unstructured data. In some embodiments, Socialware 310 may perform the processing by applying a plurality of filters 314 on the unstructured data associated with page 380. In some embodiments, the plurality of filters 314 may disassemble, analyze, and categorize the unstructured data into proprietary application element types. Example categories of application element types (AETs) may include, but are not limited to, messages, profile info, actions, and so on. The types of messages may include wall posts, broadcasts, tweets, status updates, directed message, etc. The types of profile info may include name, location, title, hobbies, websites, etc. The types of actions may include add a "friend", search a "friend", chat with a "friend", create a group, create a fan page, "like" a post, make a recommendation, etc.

In some embodiments, these application element types may be source specific. An example of a source would be a social networking site operating on a public network such as the Internet. The application element types thus generated can then be utilized in a variety of ways to facilitate the entity operating the enterprise computing environment to, for instance, control, monitor, archive, categorize, and moderate communications between its users and social networking sites operating outside the entity's private network. In some embodiments, the whole process can be transparent to end users in the enterprise computing environment.

As described above, a chain of filters from filters 314 may be utilized by Socialware 310 to process the unstructured data associated with page 380. For example, a first filter may identify certain AETs in page 380 that are specific to the source of page 380. The selection of these certain AETs may be made in accordance with a corporate rule or policy. A second filter may delete, replace, and/or modify the original content associated with these AETs and archive the original content.

As a specific example, suppose page 380 contains the following piece of code:

```
<div class = "post">
    <h1>hello!</h1>
</div>
```

In some embodiments, a first filter may identify "post" as a particular AET of interest and "hello!" as the content associated with this particular AET. Suppose per a company policy, access to this feature on page 380 is not allowed, a second filter may replace "hello!" with a default language as described above and archive the original wall post "hello!" in a database. In some embodiments, the database may be located at a central location. In some embodiments, the central location may be outside of the company's computing environment. In some embodiments, modified page 360 is then generated utilizing AETs identified and corresponding content extracted from page 380, essentially reconstructing the original page with certain feature(s) and/or message(s) encapsulated or modified as illustrated in FIG. 12. In some embodiments, the above-described process may occur at runtime and the requesting user may receive modified page 360 in real time or near real time. In some embodiments, a filter may first determine whether a response from a source contains any AET of interest. If not, the original page may be assembled and presented to the requesting user without any modification.

In some embodiments, application element types are defined on a source by source basis. This can be a manual process in which each page from a source/destination is pulled and the corresponding source code examined to find elements of interest such as form elements, text elements, calls, links, and so. A parser or application specific processor may be written for isolating each element of interest. This may be done for all uncontrolled Web applications from external sites that may be of interest to a particular client and building a library or knowledge base. This proprietary knowledge may be implemented in info tables described below with reference to FIG. 13. The URL addresses of the pulled pages may be persisted in a central database.

Referring to FIG. 3, in some embodiments, proxy 350 may access this central database and determine whether a user request contains a matching URL (step 404). If a match is found, proxy 350 may pass the request from user 330 which is destined to a social networking site of interest to Socialware 310 for processing (step 408). If not, proxy 350 may pass the request to the destination (step 406). Likewise, when proxy 350 receives a response from an external site, it may access the database and determine whether the response contains a URL that matches one of the URLs referencing a social networking site. If so, proxy 350 may pass the response from the social networking site to Socialware 310 for processing the unstructured data. If not, proxy 350 may forward the response to its destination within private network 340.

Figure 13:
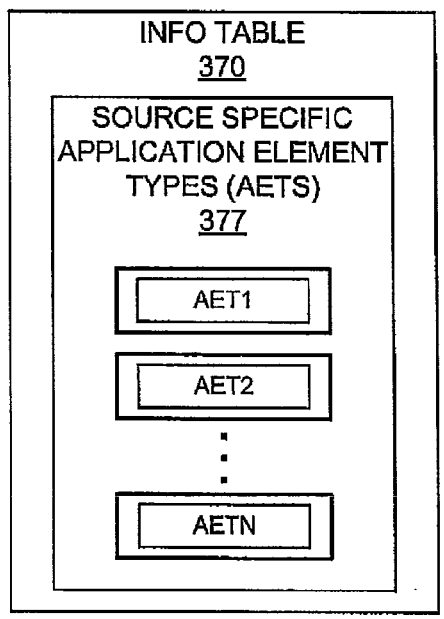
FIG. 13 depicts a simplified representation of one embodiment of an info table containing a record of what application element types are in unstructured data originating from an uncontrolled Web application.

FIG. 13 depicts a simplified representation of one embodiment of Info Table 370 containing source specific application element types 377 identified from unstructured data associated with a Web page originating from an uncontrolled Web application. In some embodiments, each AET in Info Table 370 is encapsulated with associated text or content extracted from the original Web page. In some embodiments, Info Table 370 represents a record of what structured application elements are in the incoming unstructured data.

In some embodiments, process 1200 may comprise passing payload from incoming unstructured data originating from an uncontrolled Web application through individual AET specific workflow for processing application elements contained in the unstructured data as indicated in a corresponding info table as described above with reference to FIG. 13. In some embodiments, the AET specific workflow may implement a chain of filters as described above with reference to FIGS. 7-8 and 12. For example, unstructured data originating from an uncontrolled Web application may contain a chat element. One embodiment disclosed herein may identify this chat element as an AET of interest for a particular client and may put the chat element through a chat workflow. When a user having insufficient privilege to access the chat element associated with this particular source—a social networking site, the chat workflow may apply a chat disable filter to disable this particular feature on a Web page that the user is requesting from the social networking site and construct a modified page with the chat feature disabled. The rest of the modified page may be constructed using AETs listed in the corresponding info table that keeps a record of AETs and associated content in the original page. This modified page is then delivered to the requesting user in place of the original page as described above.

These source-specific application element types can be utilized in a variety of ways to facilitate an entity operating a private network or enterprise computing environment to, for instance, control, monitor, archive, categorize, and moderate communications between its users and social networking sites operating outside the entity's private network. For example, interactions between a social networking site and a user in a private network are generally treated the same. There is currently no way to segregate and process data associated with an uncontrolled Web application differently depending upon whether the user is performing personal or professional activities. Some embodiments disclosed herein may provide a viable solution to this issue by first structuring unstructured data originating from an uncontrolled Web application into structure data in various source-specific application element types and adding a monitoring layer on top of the uncontrolled Web application or a controlled version thereof. One example of a controlled version of an uncontrolled Web application might be a page dynamically assembled on the fly utilizing AETs parsed from a Web page associated with the uncontrolled Web application. As described above, this page may have at least one feature of the uncontrolled Web application disabled and may otherwise be substantially similar to the original, unmodified Web page associated with the uncontrolled Web application.

Some embodiments of the monitoring layer may allow the user, while accessing the social networking site, to change state, mark all subsequent recorded data as such, and process the data accordingly. As an example, a user accessing a social networking site may be able to switch between personal and professional modes depending upon the type of activities the user is engaging with the social networking site. With this type of system in place, a company or the like may now have the ability to apply different policies based on the user's state. Example applications may include, but are not limited to, data retention, access control, and moderation workflows, etc.

Figure 14:
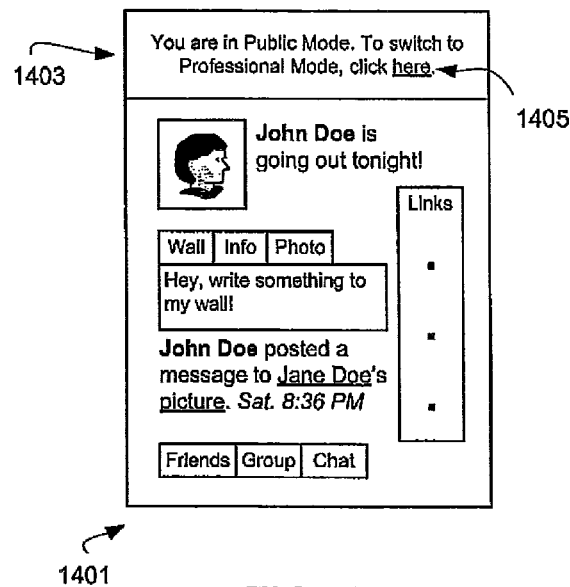
FIG. 14 depicts a simplified representation of a user interface with a selectable feature that allows a user to switch between modes of interaction.

In some embodiments, the monitoring layer may be injected on a page (with or without structuring the unstructured data described above) displayed to the user while the user is accessing the social networking site. FIG. 14 depicts a simplified representation of a user interface with a selectable feature that allows a user to switch between modes. In this example, user interface 1401 of a page representing a social networking site is inserted with functionality 1403. Although functionality 1403 is shown on the top of user interface 1401 and implemented as a bar, other places on user interface 1401 as well as different styles of implementation may also be possible. In some embodiments, functionality 1303 may comprise selectable feature 1405. Although feature 1405 shown in FIG. 14 is implemented as a link, other implementations are also possible. Example implementations may include, but are not limited to, a button, a tab, and a pull down menu. Upon selection of feature 1405, functionality 1403 may operate to notify proxy 350 and/or Socialware 310 of the change in the user's state and all subsequent activities are treated accordingly.

Functionality 1403 shown in FIG. 14 represents an underlying monitoring layer that provides an entity operating a private network from where the user is accessing the social networking site with the ability to monitor and process user activities depending upon what mode the user is in. This also gives the user the ability to distinguish different types of activities. As an example, the user may switch from a personal mode to a professional mode, indicating that the subsequent activities may be monitored in accordance with the entity's company policies and/or business rules that govern such activities.

Figure 15:
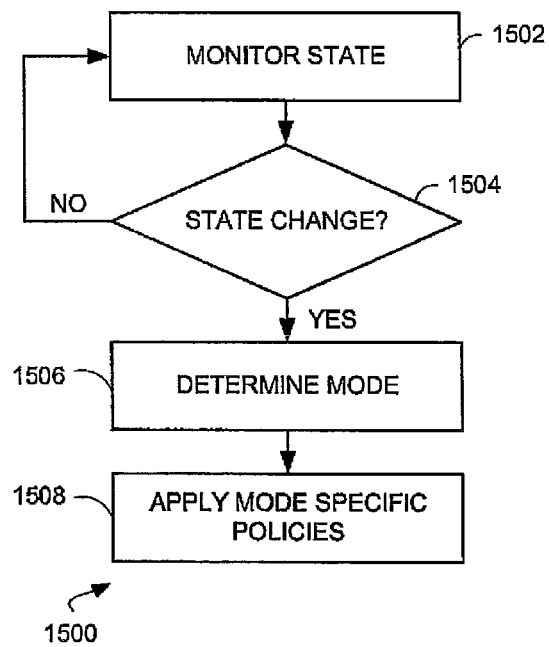
FIG. 15 depicts a flow diagram illustrating an example embodiment of a method for processing user interaction with an uncontrolled Web application depending upon user state associated with a particular type of activity.

FIG. 15 depicts a flow diagram illustrating an example embodiment of a method for processing user interaction with an uncontrolled Web application depending upon user state associated with a particular type of activity. In some embodiments, flow 1500 may comprise continuously monitoring the action of a user accessing a social networking site (step 1502), detecting a change in the user's state (step 1504), determining a mode associate with the change of state (step 1506), and applying policies specific to the particular mode (step 1508). One example action that may trigger the change of user state may be a selection of feature 1405 as illustrated in FIG. 14. In this non-limiting example, selecting feature 1405 may allow the user to switch from the Public Mode to the Professional Mode. Subsequently, activities and data associated therewith—including contents that the user posted or attempts to post on the social networking site—in the Professional Mode may be tagged and processed in accordance with policies associated with the Professional Mode. Other types of modes are also possible for various purposes, including marketing, business networking, family, security, etc.

Figure 16:
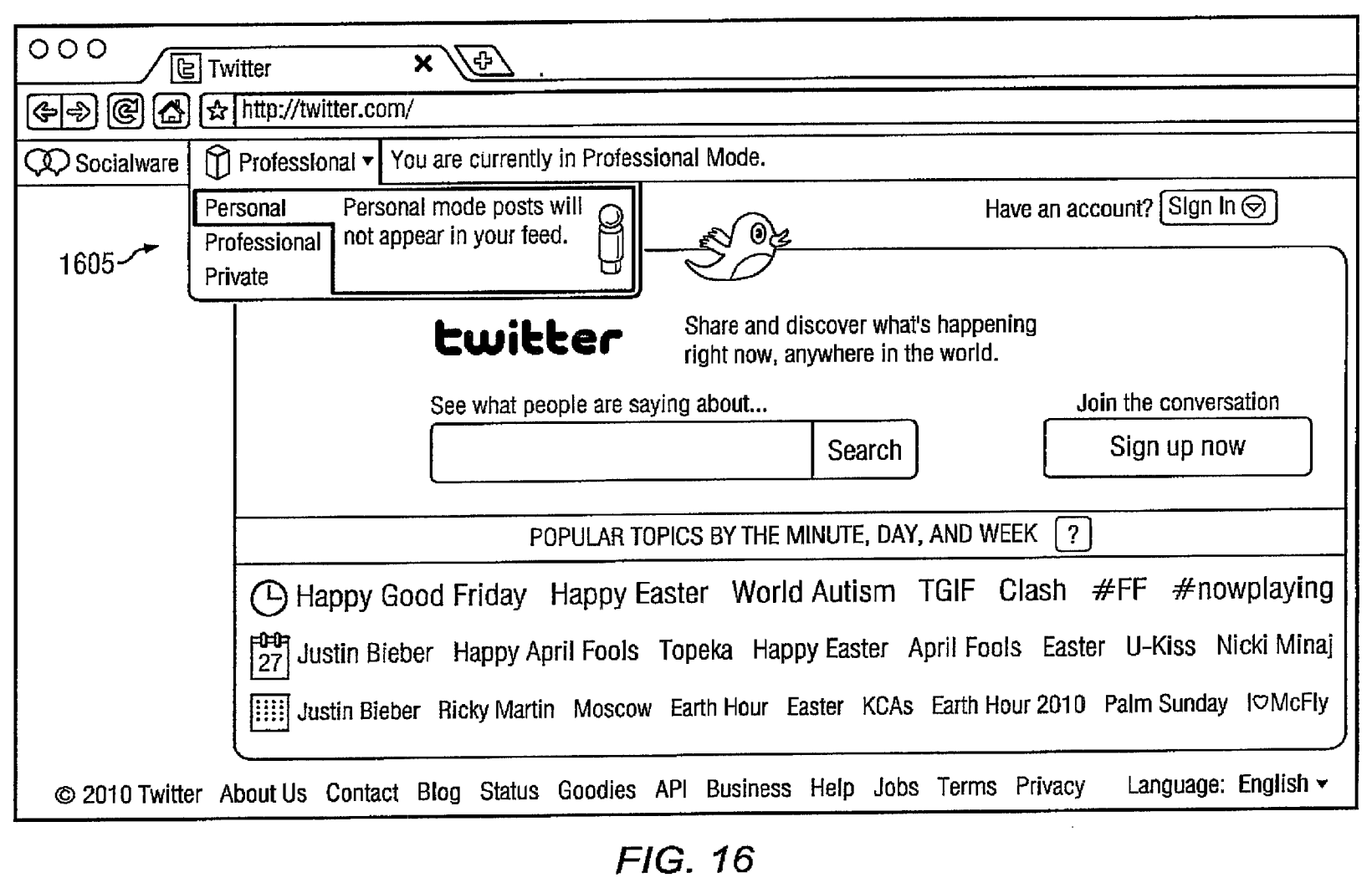

FIG. 16 is a screenshot of a user interface with a selectable feature implementing an embodiment disclosed herein. In this example, pull down menu 1605 provides three modes: personal, professional, and private. To switch between these modes, a user can simply select one of the modes via pull down menu 1605.

In some embodiments, user interaction with the controlled version of the Web application is persisted and organized, for instance, in a database or a data repository, separate and independent from unstructured data originating from the uncontrolled Web application. In some embodiments, the persisted user interaction with the controlled version of the Web application may comprise contents and corresponding information such as tags associated therewith. In some embodiments, upon user selection to switch back to the uncontrolled Web application, no user activity may be recorded and/or tracked and no user interaction information may be stored in a database or data repository.

In some embodiments, the structured data corresponding to an uncontrolled Web application may be utilized to create a corresponding multi-mode Web application. The multi-mode Web Application may, in a first mode, appear and function substantially the same as the original uncontrolled Web Application with corresponding unstructured data originating therefrom. In a second mode, the multi-mode Web Application may have additional functionality configured for a target audience. Following the example described above, in some embodiments, the first and second modes may be the public and professional modes. Additional modes are also possible, for instance, personal versus commercial modes, private versus public, etc.

In some embodiments, user interaction with the different modes of the Web application may be persisted and organized differently, all of which may be separate and independent from unstructured data originating from the uncontrolled Web application. In some embodiments, the persisted user interaction with the different modes of the Web application may comprise contents and corresponding information such as tags associated therewith. In some embodiments, contents tagged in different modes may be organized in and associated with different applicant element types.

In some embodiments, the multi-mode Web Application may comprise a toggling functionality for an end user to switch between the modes. In some embodiments, the toggling functionality may be implemented as a single click function. As described above, the toggling functionality represents a monitoring layer for an uncontrolled Web application that an entity operating a private network can utilize to distinguish different types of user activities associated with accessing the uncontrolled Web applications, allowing the entity to isolate those activities and contents that should be monitored and process them according to internal policies and/or business rules.

Although shown and described throughout this disclosure with specific reference to an enterprise, this disclosure is intended to encompass other networking and business environments including, but not limited to: small businesses, individual users, homes, public networks, etc. It should be understood that the description is by way of example only and is not to be construed in a limiting sense. It is to be further understood, therefore, that numerous changes in the details of the embodiments disclosed herein and additional embodiments will be apparent to, and may be made by, persons of ordinary skill in the art having reference to this description. For example, in addition to the above described embodiments, those skilled in the art will appreciate that this disclosure has application in a wide array of arts in addition to social networking and this disclosure is intended to include the same. Accordingly, the scope of the present disclosure should be determined by the following claims and their legal equivalents.

The invention claimed is:

1. A method for controlling access to a web site, comprising:
performing, by a server computer in a network:
continuously monitoring, while a user interacts with a site, access to the site by a multi-mode Web application on a device within the network, the site operating outside of the network and not controlled by the network, wherein the multi-mode Web application appears and functions substantially same as a Web application controlled by the site which is accessed by the multi-mode Web application;
detecting, via the multi-mode Web application on the device, a particular type of user activity with the site operating outside of the network;
based on access by the device in the network to the site operating outside of the network, receiving unstructured data from outside of the network and responsive to the detection of the particular type of user activity with the site operating outside of the network, dynamically converting at least part of the unstructured data to structured data utilizing application element types, wherein the application element types are parsed from the unstructured data utilizing one or more filters specific to the site operating outside of the network, wherein the unstructured data comprises source code data for the Web application controlled by the site operating outside the network, and wherein the structured data comprises a controlled version of the Web application; and
applying a policy to the structured data, wherein the policy is internal to the network.

2. The method according to claim 1, wherein applying the policy comprises blocking access by the device to the structured data or limiting access by the device to at least a portion of the structured data.

3. The method according to claim 1, wherein applying the policy further comprises modifying at least a portion of the structured data prior to forwarding to the device in the network.

4. The method according to claim 1, wherein applying the policy further comprises limiting access by the device to one or more features associated with the structured data.

5. The method according to claim 4, wherein at least one of the one or more features associated with the structured data comprises posting or attempting to post content on the site operating outside of the network.

6. The method according to claim 1, wherein the site is a social media site operating outside of the network.

7. The method according to claim 1, wherein the unstructured data is received from the site operating outside of the network, and wherein the at least part of the unstructured data is dynamically converted to the structured data utilizing one or more of the application element types parsed from the unstructured data received from the site operating outside of the network.

8. The method according to claim 7, wherein the application element types are specific to the site operating outside of the network.

9. The method according to claim 1, further comprising tagging the structured data, wherein tagging the structured data comprises utilizing one or more of the application element types parsed from the unstructured data.

10. The method according to claim 9, further comprising:
tagging activities interacting with the site operating outside of the network; and
applying one or more policies to the tagged activities.

11. A computer program product comprising at least one non-transitory computer readable medium storing instructions translatable by at least one processor, the instructions when translated causing a computer in a network to perform:
continuously monitoring, while a user interacts with a site, access to the site by a multi-mode Web application on a device within the network, the site operating outside of the network and not controlled by the network, wherein the multi-mode Web application appears and functions substantially same as a Web application controlled by the site which is accessed by the multi-mode Web application;
detecting, via the multi-mode Web application on the device, a particular type of user activity with the site operating outside of the network;
based on access by the device in network to the site operating outside of the network, receiving unstructured data from outside of the network and responsive to the detection of the particular type of user activity with the site operating outside of the network, dynamically converting at least part of the unstructured data to structured data utilizing application element types, wherein the application element types are parsed from the unstructured data utilizing one or more filters specific to the site operating outside of the network, wherein the unstructured data comprises source code data for the Web application controlled by the site operating outside the network, and wherein the structured data comprises a controlled version of the Web application; and
applying a policy to the structured data, wherein the policy is internal to the network.

12. The computer program product of claim 11, wherein applying the policy further comprises blocking access by the device to the structured data or limiting access by the device to at least a portion of the structured data.

13. The computer program product of claim 11, wherein applying the policy further comprises modifying at least a portion of the structured data prior to forwarding to the device in the network.

14. The computer program product of claim 11, wherein applying the policy further comprises limiting access by the device to one or more features associated with the structured data.

15. The computer program product of claim 14, wherein at least one of the one or more features associated with the structured data comprises posting or attempting to post content on the site operating outside of the network.

16. The computer program product of claim 11, wherein the site is a social media site operating outside of the network.

17. The computer program product of claim 11, wherein the unstructured data is received from the site operating outside of the network, and wherein the at least part of the unstructured data is dynamically converted to the structured data utilizing one or more of the application element types parsed from the unstructured data received from the site operating outside of the network.

18. The computer program product of claim 17, wherein the application element types are specific to the site operating outside of the network.

19. The computer program product of claim 11, wherein the instructions when translated further cause the computer in the network to perform:

tagging the structured data, wherein tagging the structured data comprises utilizing one or more of the application element types parsed from the unstructured data.

20. The computer program product of claim 19, wherein the instructions when translated further cause the computer in the network to perform:

tagging activities interacting with the site operating outside of the network; and applying one or more policies to the tagged activities.

21. A system comprising:

at least one processor; and at least one non-transitory computer readable medium storing instructions translatable by the at least one processor, the instructions when translated causing a computer in a network to perform:

continuously monitoring, while a user interacts with a site, access to the site by a multi-mode Web application on a device within the network, the site operating outside of the network and not controlled by the network, wherein the multi-mode Web application appears and functions substantially same as a Web application controlled by the site which is accessed by the multi-mode Web application;

detecting, via the multi-mode Web application on the device, a particular type of user activity with the site operating outside of the network;

based on access by the device in the network to the site operating outside of the network, receiving unstructured data from outside of the network and responsive to the detection of the particular type of user activity with the site operating outside of the network, dynamically converting at least part of the unstructured data to structured data utilizing application element types, wherein the application element types are parsed from the unstructured data utilizing one or more filters specific to the site operating outside of the network, wherein the unstructured data comprises source code data for the Web application controlled by the site operating outside the network, and wherein the structured data comprises a controlled version of the Web application; and applying a policy to the structured data, wherein the policy is internal to the network.

22. The system of claim 21, wherein applying the policy further comprises blocking access by the device to the structured data or limiting access by the device to at least a portion of the structured data.

23. The system of claim 21, wherein applying the policy further comprises modifying at least a portion of the structured data prior to forwarding to the device in the network.

24. The system of claim 21, wherein applying the policy further comprises limiting access by the device to one or more features associated with the structured data.

25. The system of claim 24, wherein at least one of the one or more features associated with the structured data comprises posting or attempting to post content on the site operating outside of the network.

26. The system of claim 21, wherein the site is a social media site operating outside of the network.

27. The system of claim 21, wherein the unstructured data is received from the site operating outside of the network, and wherein the at least part of the unstructured data is dynamically converted to the structured data utilizing one or more of the application element types parsed from the unstructured data received from the site operating outside of the network.

28. The system of claim 27, wherein the application element types are specific to the site operating outside of the network.

29. The system of claim 21, wherein the instructions when translated further cause the computer in the network to perform:

tagging the structured data, wherein tagging the structured data comprises utilizing one or more of the application element types parsed from the unstructured data.

30. The system of claim 29, wherein the instructions when translated further cause the computer in the network to perform:

tagging activities interacting with the site operating outside of the network; and applying one or more policies to the tagged activities.

* * * * *